United States Patent [19]

Mendham

[11] Patent Number: 5,269,057
[45] Date of Patent: Dec. 14, 1993

[54] METHOD OF MAKING REPLACEMENT AIRFOIL COMPONENTS

[75] Inventor: Alvin L. Mendham, Holton, Mich.

[73] Assignee: Freedom Forge Corporation, Burnham, Pa.

[21] Appl. No.: 814,723

[22] Filed: Dec. 24, 1991

[51] Int. Cl.$^5$ .............................................. B23P 15/00
[52] U.S. Cl. ................................ 29/889.1; 29/402.08; 29/402.13
[58] Field of Search ............ 29/889.1, 402.08, 402.13; 228/119

[56] References Cited

U.S. PATENT DOCUMENTS

| | | | |
|---|---|---|---|
| 3,650,635 | 3/1972 | Wachtell et al. | 29/402.13 |
| 4,305,697 | 12/1981 | Cohen et al. | 29/889.1 |
| 4,326,833 | 4/1982 | Zelahy et al. | 29/889.1 |
| 4,883,216 | 11/1989 | Patsfall | 29/889.1 |
| 4,893,388 | 1/1990 | Amos et al. | 29/402.13 |
| 4,924,581 | 5/1990 | Jakobsen | 29/402.13 |
| 5,031,311 | 7/1991 | Comensoli | 29/889.1 |
| 5,109,606 | 5/1992 | De Michael et al. | 29/889.1 |

FOREIGN PATENT DOCUMENTS

0071689  6/1981  Japan ................. 29/889.1

Primary Examiner—Irene Cuda
Attorney, Agent, or Firm—Webb, Burden, Ziesenheim & Webb

[57] ABSTRACT

A method for replacing airfoil components includes the steps of identifying a portion of the airfoil to be replaced, removing the portion by a nonconventional machining process, such as continuous wire electrical discharge machining, and forming a replacement member utilizing a similar cutting process. A cutting path utilized to remove the portion to be replaced and to form the replacement member includes interlocking projections and sockets and may include one or more tapers along the cutting path so that the portion may be removed only by lifting in one direction. In cases where an entire airfoil is replaced, a first projection may be tapered in one direction while a second projection is tapered in an opposite direction so that the airfoil may not be removed as long as its adjacent flowpath walls are fixed relative to one another. Gas bending load dampers and zero gap standoffs may also be included for precision alignment of the replacement member and further securement of the replacement member in the airfoil.

19 Claims, 11 Drawing Sheets

METHOD OF MAKING REPLACEMENT AIRFOIL COMPONENTS

FIELD OF THE INVENTION

This invention relates to the replacement of damaged or worn portions of complicated metal structures. More particularly, this invention relates to the repair and/or replacement of turbine vanes.

BACKGROUND OF THE INVENTION

In many industries, there are found mechanical devices with complicated metal parts. Such industries include aerospace, transportation, nuclear, power transmission, communications, petrochemical, drilling and related industries. Exemplary of the mechanical devices mentioned is the gas turbine including a turbine case having a large number of turbine vanes which are subjected to accelerated wear and/or failure due to high stresses, elevated temperatures and environments rich in erosive and corrosive agents. The turbine vanes typically have spaced apart convex and concave surfaces joined on opposite edges by a rounded leading edge and a converging trailing edge. The vanes are joined to cylindrical or conical flowpath walls at one or both sides.

As can be appreciated, turbines are of an extremely complex design, costly to manufacture and, all things considered, have a limited operational service life. Therefore, it is desirable to repair or refurbish these components rather than replace them. Techniques for replacing part or all of the vanes in a turbine rotor are disclosed in U.S. Pat. Nos. 3,650,635; 3,802,046; 4,141,127; 4,305,697; 4,326,833; and 4,832,252.

Any technique for repair of turbine components must be reliable. One of the ongoing concerns of the aerospace industry has been the potential for catastrophic ingestion damage to downstream stages of the turbine upon failure of a component repaired with a simple butt joint.

SUMMARY OF THE INVENTION

It is an object according to this invention to provide an improved method for repairing structures with complex configurations through the use of mechanically interlocked replacement members.

It is a further object to provide an improved method of repairing a structure, such as a vane, by the precise removal of a distressed portion by cutting the distressed portion away along a path which will become the bonding surface for the replacement portion, which path defines mechanical interlocking.

It is a further object to provide a method of repairing structures such that upon joining of replacement portions into the original structure, minimal finishing is required to restore the original tolerances.

It is a still further object of this invention to provide a method of replacing all or a portion of turbine components in a manner that minimizes the potential for catastrophic ingestion of a replacement section into the downstream stages.

Briefly, according to this invention, there is provided a method of repairing metal structures comprising removing and replacing a portion thereof. The method comprises the steps of:

a) identifying a portion of said metal structure to be repaired;

b) defining a cutting path on the metal structure around said portion, said cutting path including a plurality of projections and corresponding sockets;

c) excising said portion from the metal structure along said cutting path to leave a first bonding surface on said metal structure corresponding to said cutting path;

d) forming a replacement member having outer dimensions corresponding to said cutting path, said replacement member having a second bonding surface adapted to mate with said first bonding surface on the metal structure;

e) inserting said replacement member into the metal structure to align said first and second bonding surfaces and mechanically interlock said projections and corresponding sockets; and f) securing said replacement member in the metal structure by a metallurgical joining process.

Preferably, a computer numerical control (CNC) program is used to remove the portion of the structure to be replaced. The CNC program used to remove the damaged portion and cut a replacement member are substantially the same. The CNC programs differ such that the cutting kerf is taken from the excised portion when it is being cut away and the cutting kerf is not taken from the replacement member when cutting the replacement member, thus enabling a close fit. Most preferably, the excised portion has tapered edges such that it can only be lifted out in one direction, contrary to the direction of gas flow.

BRIEF DESCRIPTION OF THE DRAWINGS

Further features and advantages of this invention will become clear from reading the following detailed description made with reference to the drawings in which.

DESCRIPTION OF THE PREFERRED EMBODIMENTS

If required, the structures to be repaired are first stripped of all residual coatings, dirt, oil and foreign deposits, neutralized, rinsed and dried in accordance with accepted practices. The cleaned structures are then evaluated to determine the extent of the distress and the remaining dimensional integrity. Those portions of the structures that must be replaced are identified. In order to practice this invention, a line of sight access to the portion to be replaced is required. In complicated structures, this may not be possible without cutting the structure into a plurality of sections. In the case of a turbine stator vane assembly, because the vanes are overlapping or closely spaced, it may be necessary to cut vane sections (airfoils and adjacent flowpath walls) from the assembly by severing the cylindrical or conical flowpath walls, which may be rims or hubs. Thereafter, the distressed portion of the vane sections can be cut away.

Figure 16:
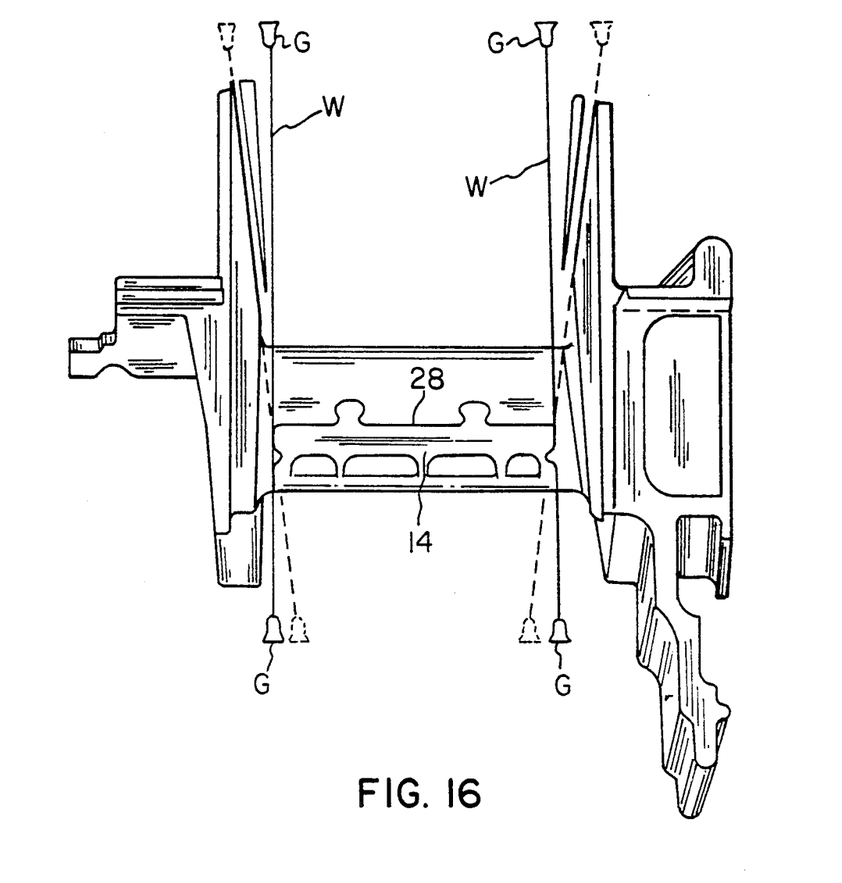
FIG. 16 is an end perspective view of an airfoil having its trailing edge removed by electrical discharge wire machining according to the present invention.
Figure 17:
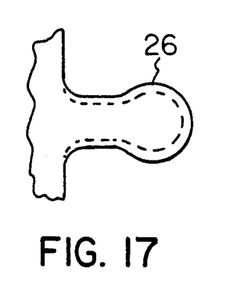
FIG. 17 discloses a front view of a portion of the trailing edge replacement shown in FIG. 11.
Figure 18:
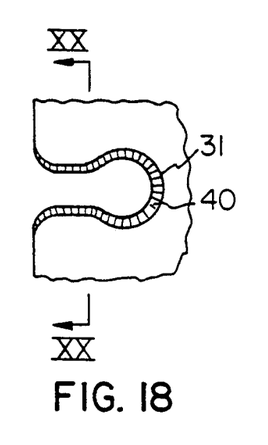
FIG. 18 shows a portion of the doublet vane section showing a tapered socket.
Figure 19:
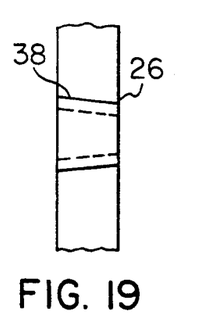
FIG. 19 is a top view of the portion of the trailing edge replacement shown in FIG. 17.
Figure 20:
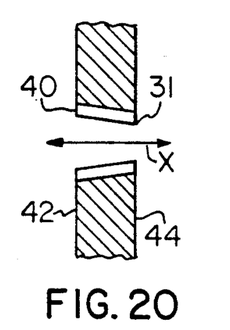
FIG. 20 is a section taken along lines XX—XX.

The cutting apart of the structure and the cutting away of distressed portions to be replaced can be performed by such non-conventional machining processes as electro-chemical machining, electrical discharge machining, and computer numerically controlled electrical discharge wire cutting (EDWC) sometimes called travelling wire EDM. Electrical discharge wire cutting is the process of choice and is similar in configuration to bandsawing, except the "saw blade" is a continuous wire electrode W of small diameter, as shown in FIG. 16. Material removal from the workpiece is effected as a result of spark erosion. The wire is slowly fed from a spool through the workpiece so that the size of the wire, which determines the size of the kerf (slot), is relatively constant during the entire cut. The relative motion between the workpiece and the EDWC apparatus is controlled by a computer numerical control (CNC). Typically, the wire electrode moves vertically over sapphire or diamond wire guides G, one above and one below the portion of the workpiece being cut. In this case, the relative motion between the workpiece (usually carried by an x-y position table and/or column) and the EDWC apparatus is in a horizontal direction. A steady stream of deionized water or other nonconductive fluid is used to cool the workpiece and flush the kerf. The details of EDWC and CNC are known in the art and those details form no part of the invention.

Figure 1:
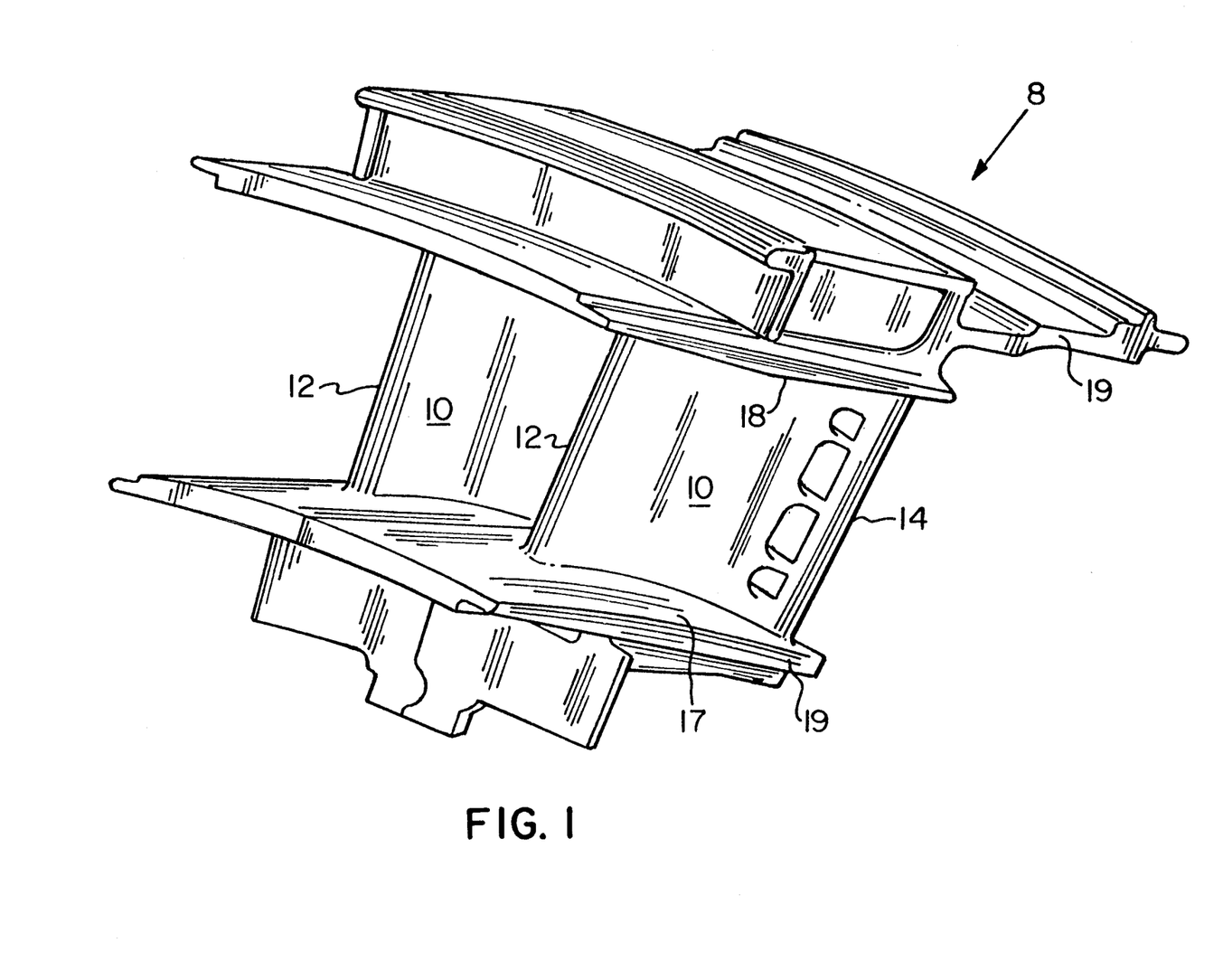
FIG. 1 is a perspective view of a doublet vane section from a turbine stator assembly.
Figure 2:
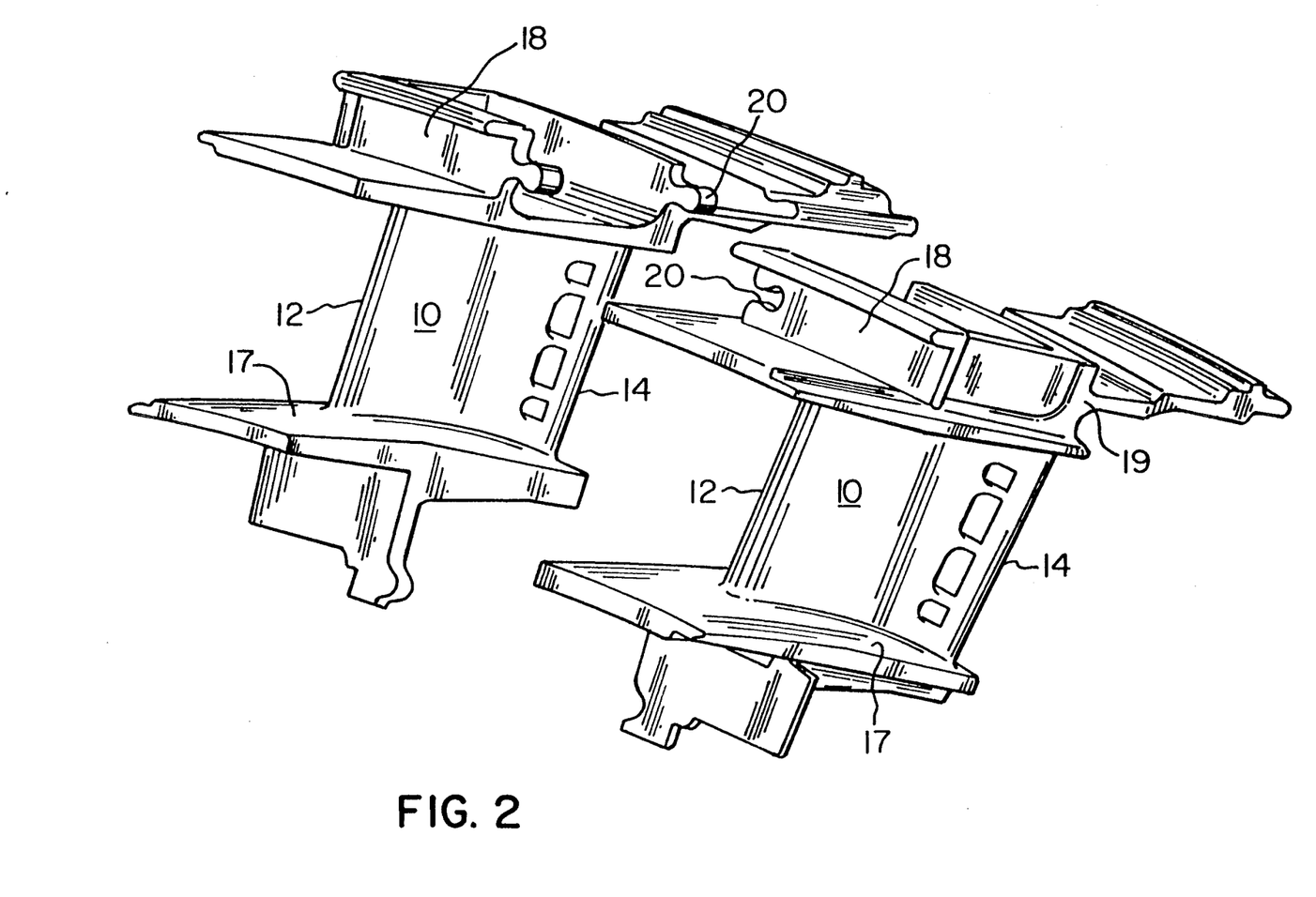
FIG. 2 is a fragmentary view of the doublet vane section of FIG. 1.
Figure 3:
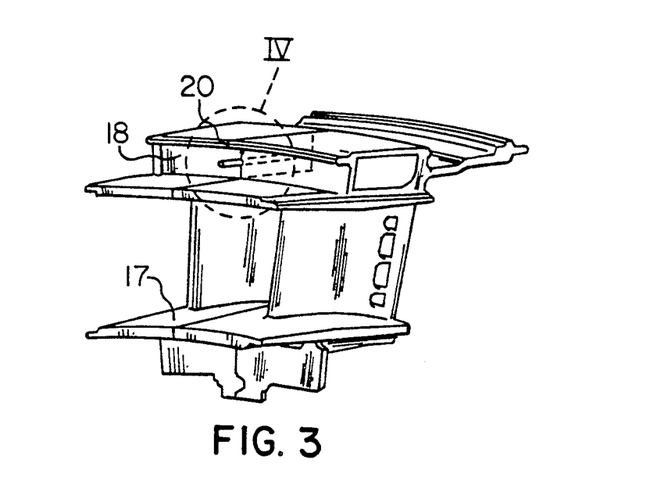
FIG. 3 is a perspective view of the doublet vane section of FIG. 1 including a cutting path in an outer flowpath wall of the vane section with a gage pin inserted in the cutting kerf according to the present invention.
Figure 4:
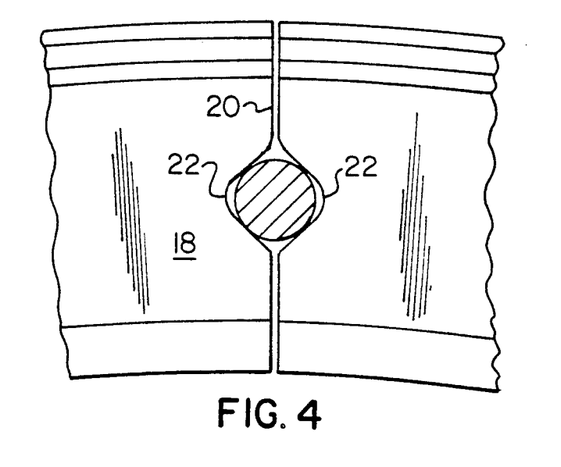
FIG. 4 is an enlarged end view of the gage pin and outer flowpath wall of FIG. 3.
Figure 5:
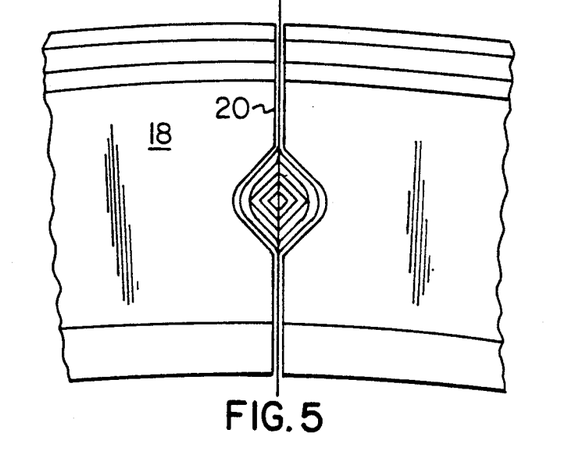
FIG. 5 is an enlarged end view of the outer flowpath wall of FIG. 4 illustrating the wire path movements required to manufacture the facing triangle cut.

FIG. 1 shows a doublet vane section 8 circumferentially juxtaposed. Preferably, each cutaway vane section, except for its individual distress, is dimensionally identical to each other vane section. Each vane section includes at least one airfoil 10 having a leading edge 12 and a trailing edge 14. The airfoils are joined at each side to inner rim 17 and outer rim 18, also referred to as "flowpath walls 17 and 18". The particular vane section shown supports airfoils that slightly overlap as viewed in the axial direction from engine centerline. Referring to FIGS. 2-5, the cutting paths that create the vane sections are illustrated as follows: The face 19 illustrates a simple cut. The cutting path shown by line 20 is more intricate. The outer rim 18 may be provided with facing triangle-shaped notches 22 on each side of the kerf which are used during reassembly for positive mechanical orientation and spacing of parts to take into consideration the removal of the kerf. Cutting path 20 can take many forms (straight cut, mechanical interlock, facing triangles, etc.) based upon the stress loading, dimensional tolerances, part geometry, alloy, customer experience/preference and complexity of the assembly.

Preferably, the EDWC wire diameter size should be less than 0.006 inch when the facing-triangle cut is made to minimize the dimensional impact of the kerf. During cutting, every effort should be made to avoid cooling hole intersection. Where kerf is not a limiting factor, wire diameter may be increased to 0.010 inch to reduce cutting time and minimize wire breakage.

Figure 6:
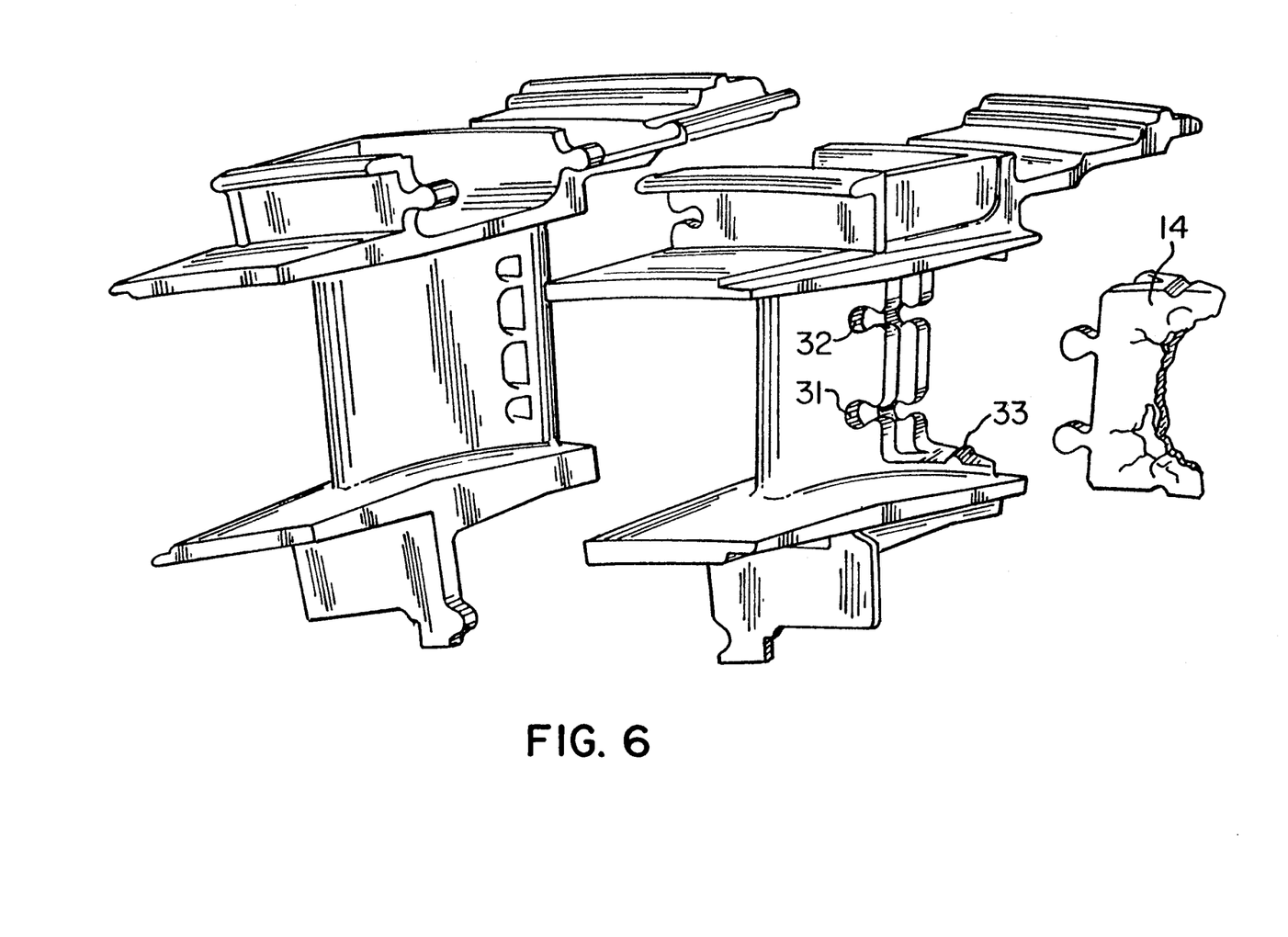
FIG. 6 is a fragmentary view of a doublet vane section showing removal of a damaged trailing edge according to the present invention.
Figure 7:
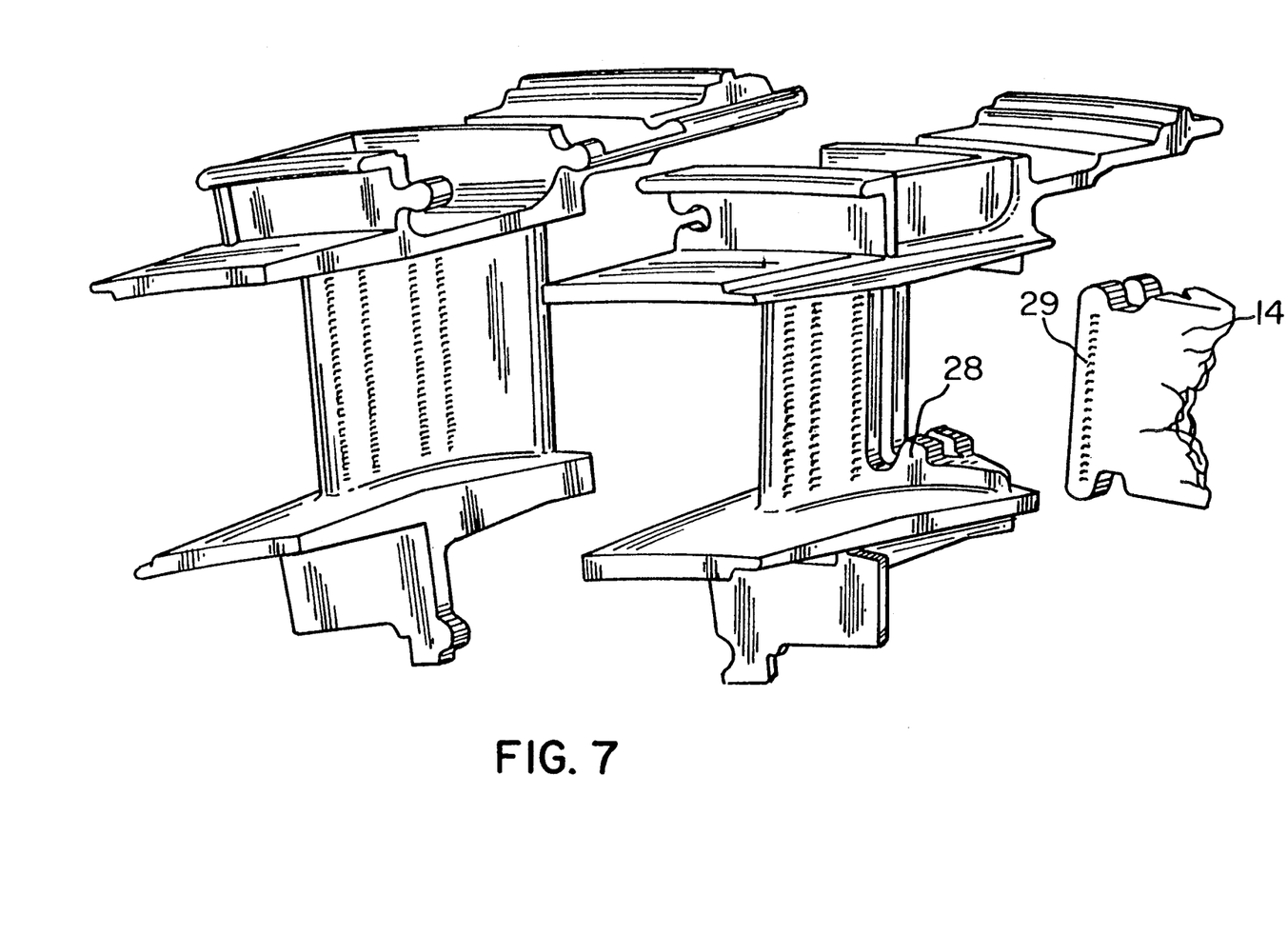
FIG. 7 is a fragmentary view of a doublet vane section having air cooling channels showing removal of a damaged trailing edge.
Figure 8:
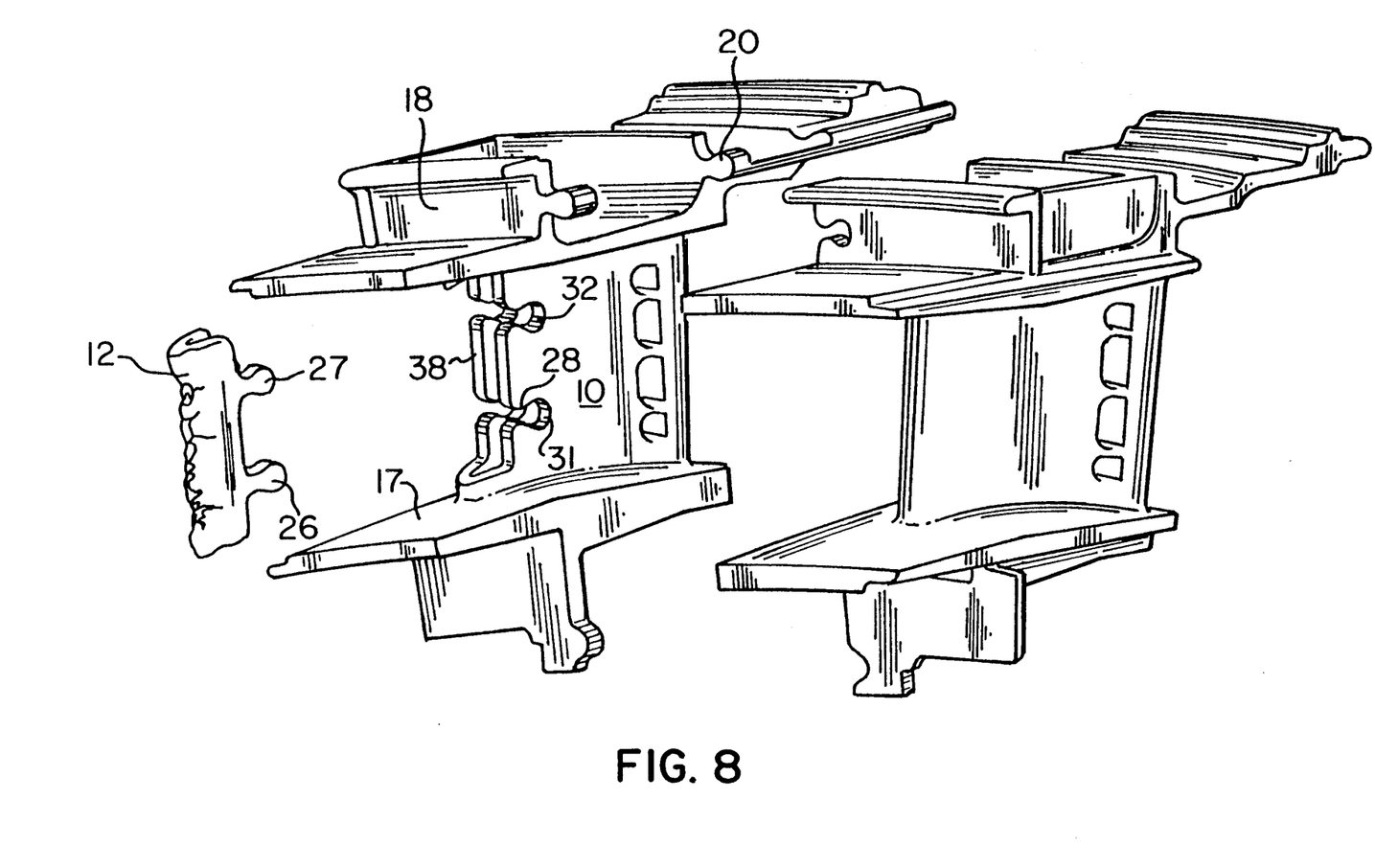
FIG. 8 is a fragmentary view of a doublet vane section showing removal of a damaged leading edge.
Figure 9:
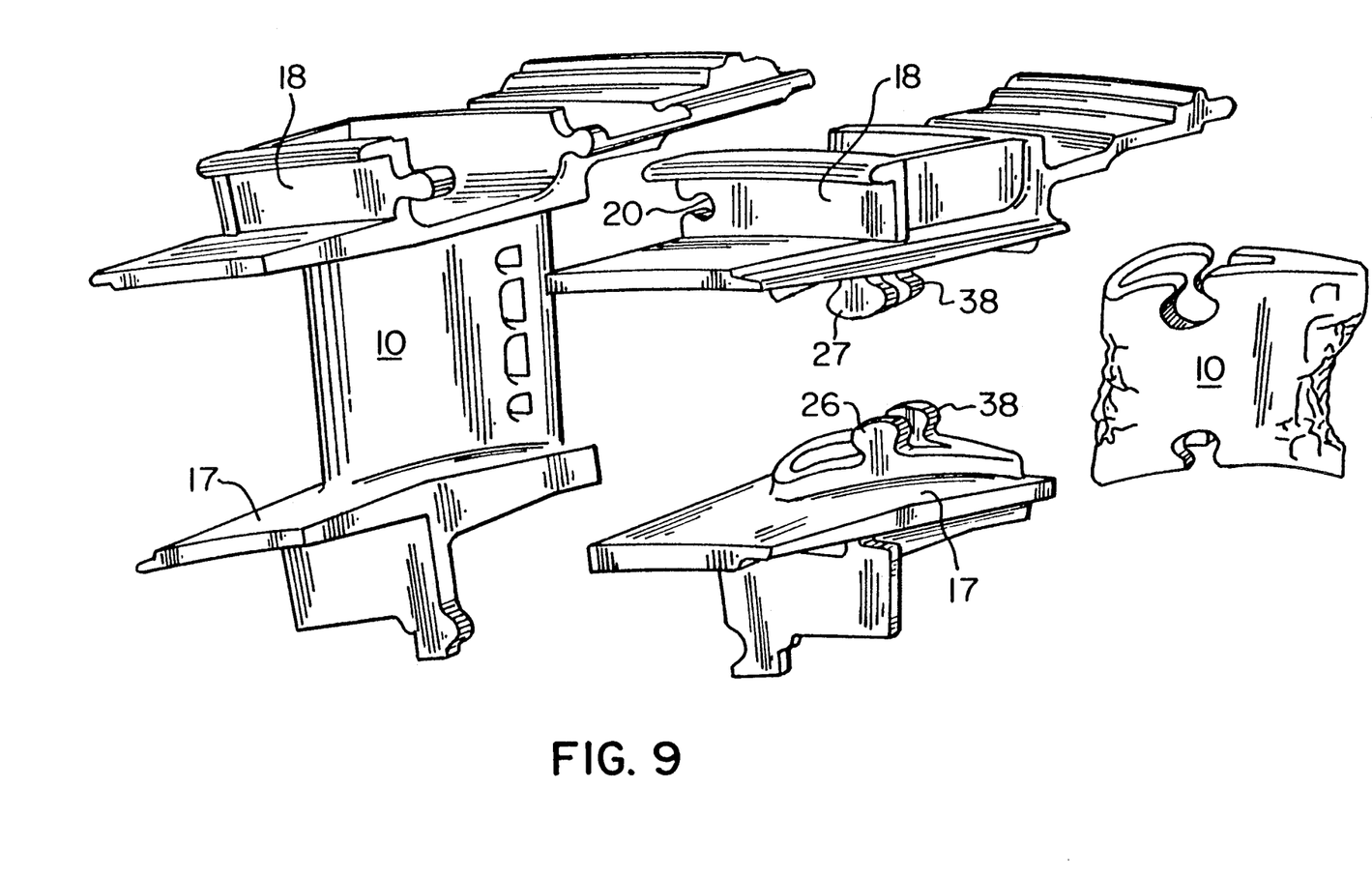
FIG. 9 is a fragmentary view of a doublet vane section showing removal of a complete airfoil.
Figure 10:
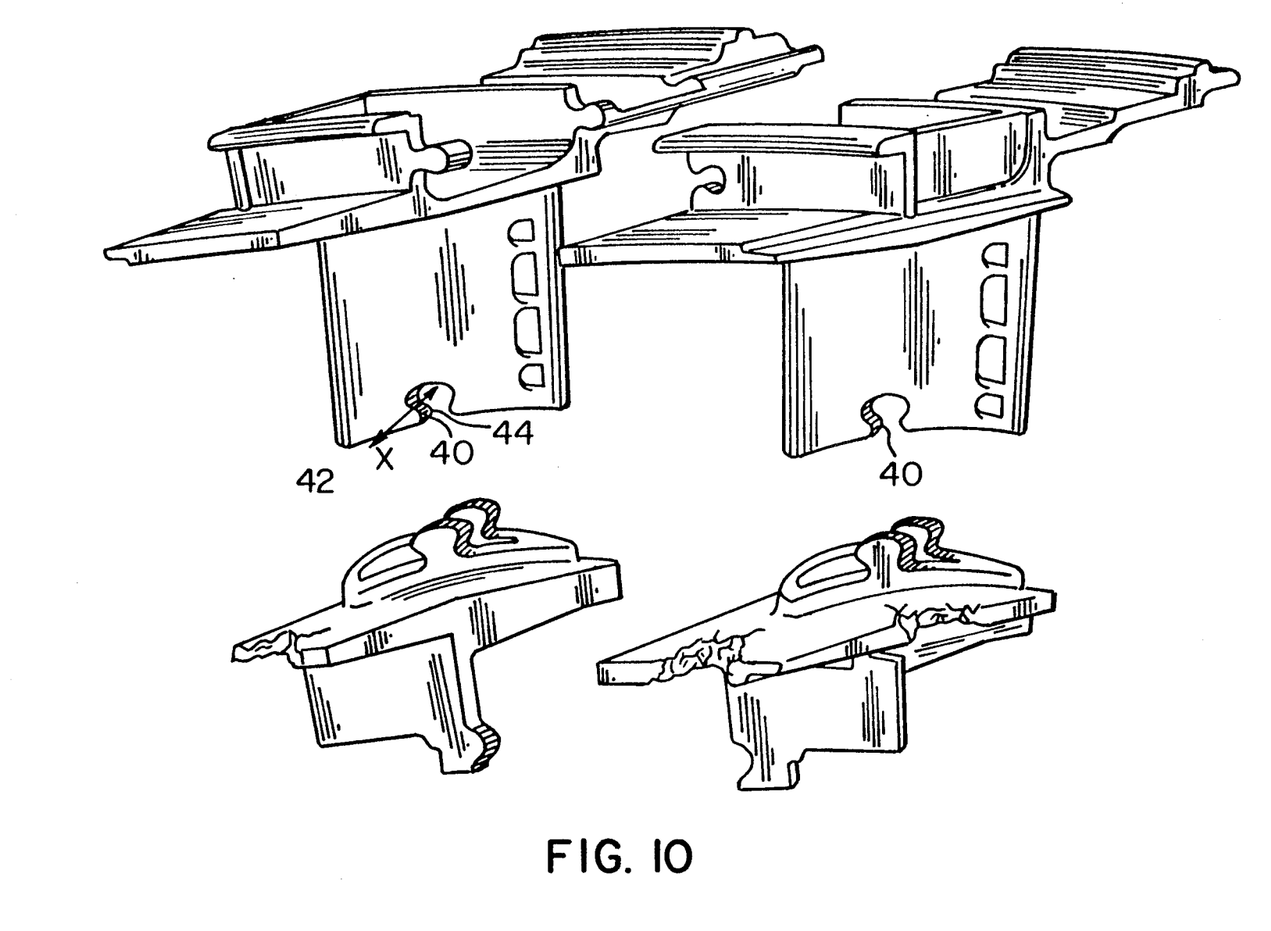
FIG. 10 is a fragmentary view of a doublet vane section showing removal of a damaged inner flowpath wall.
Figure 11:
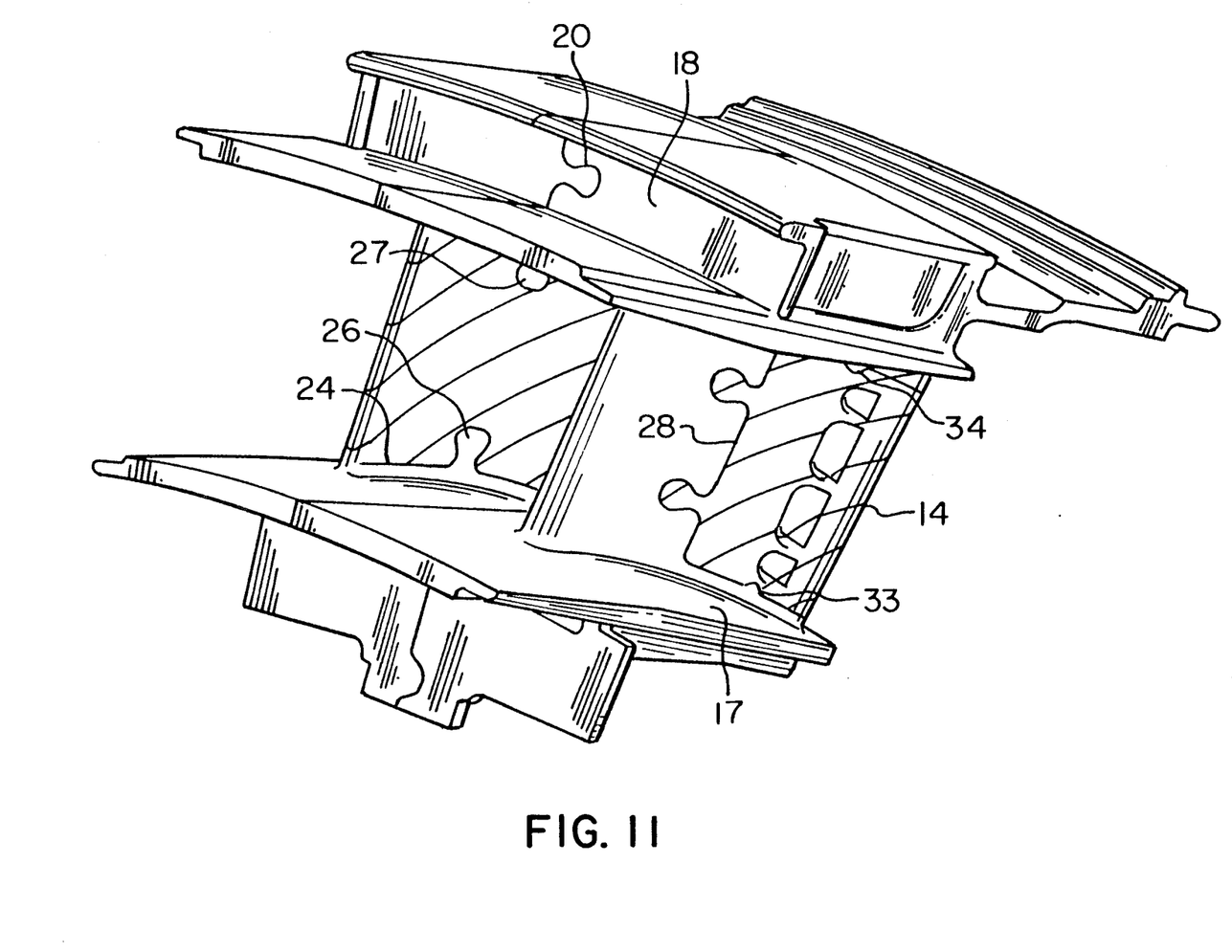
FIG. 11 is a perspective view of a doublet vane section showing complete replacement of one airfoil and trailing edge replacement of an adjacent airfoil.

Once the vane sections have been cut apart, the airfoils themselves can be partially or totally replaced. Referring to FIGS. 6-11, a cutting path 24 is required for removing and replacing the entire airfoil. The airfoil is cut away from the inner and outer rims with bulb-shaped projections 26, 27 extending from each rim, as shown in FIG. 9. To remove the airfoil 10 after cutting, it would normally be necessary to lift the airfoil in the axial direction (upward out of the paper as the figure is drawn) as discussed below. Alternatively, each projection may be provided with a reverse taper. Cutting path 28 is required for removing and replacing only the leading edge 12 or trailing edge 14. The trailing or leading edge of the airfoil is cut away leaving bulb-shaped sockets 31, 32 on the cut edge of the remaining portion of the airfoil as shown in FIG. 6. FIG. 7 shows the cutting path 28 modified to accommodate cooling channels 29 in the airfoil 10. Again, to remove the trailing edge portion, it would be necessary to lift (or push) the edge portion in the axial direction. The cutting path may be such to provide bending load dampers 33, 34 adding rigidity to long span sections such as the leading and trailing edges.

The mechanical interlocking in two dimensions (provided by the bulb-shaped interlocking projections and sockets) minimizes the possibility of debris ingestion to subsequent stages of the turbine in the event of catastrophic failure of the bond to the replacement portion. The shape, size and number of interlocks should minimize stress concentrations. Referring to FIGS. 12-15, the preferred dimensions for the interlocking projections and sockets shown are set forth in the following table.

TABLE 1
AIRFOIL REPLACEMENT
HORIZONTAL LOCKING DESIGN (NON U-V)

| DIM. | DESCRIPTION | VALUE FIXED/VAR. | CRITERIA/ LOGIC | ACTUALLY USED |
|---|---|---|---|---|
| A | DISTANCE FROM ENGINE ℄-INNER (RAD.) | VARIABLE | DEFINE* | 8.085" R |
| B | DISTANCE FROM ENGINE ℄-OUTER (RAD.) | VARIABLE | DEFINE** | 9.050" R |
| C | OVERALL HEIGHT | VARIABLE | DEFINE | 1.300" |
| D | THICKNESS OF INTER-SECTED CROSS SECTION | VARIABLE | DEFINE | 0.040" |
| F | DISTANCE FROM TE TO ℄ OF DAMPER | FIXED | .42 C | 0.546" |
| G | DISTANCE ACROSS LOCK NECK | FIXED | 2.75 D | 0.110" |
| H | HEIGHT OF LOCK | FIXED | 2.075 G | 0.22825" |
| I | WIDTH OF LOCK | FIXED | $\frac{100G}{69}$ | 0.15942" |
| J | BLEND RADII | FIXED | 1.5942 D | 0.063768" |
| K | BRAZE GAP | VARIABLE | DEFINE | 0.0015" |
| Q | NUMBER OF LOCKS | VARIABLE | DEFINE | 2 |
| R | TAPER ANGLE | VARIABLE | DEFINE | 2 DEGREES |
| A' | = A + K | FIXED | (INSERT) | 8.0865" R |
| B' | = B − K | FIXED | (INSERT) | 9.0485" R |
| C' | = C | FIXED | (INSERT) | 1.300" |
| D' | = D | FIXED | (INSERT) | 0.040" |
| F' | = F | FIXED | (INSERT) | 0.546" |
| G' | = G + 2K | FIXED | (INSERT) | 0.113" |
| H' | = H | FIXED | (INSERT) | 0.22825" |
| I' | = I | FIXED | (INSERT) | 0.15942" |
| J' | = J | FIXED | (INSERT) | 0.063768" |
| K' | = K | FIXED | (INSERT) | 0.0015" |
| N' | = ℄ LOCK TO ℄ OF STANDOFF | FIXED | $\frac{F - 2J}{2}$ | 0.209232" |
| O' | = LENGTH OF FLAT FROM ℄ OF STANDOFF | FIXED | $\frac{N}{2}$ | 0.104616" |
| P' | = TANGENCY OF BLEND RADIUS TO ℄ OF STANDOFF | FIXED | $\frac{2(N)}{3}$ | 0.139488" |

NOTE:
*DIM. MUST CLEAR CURVATURE OF INNER BAND PLATFORM
**DIM. MUST CLEAR CURVATURE OF OUTER BAND PLATFORM

Figure 12:
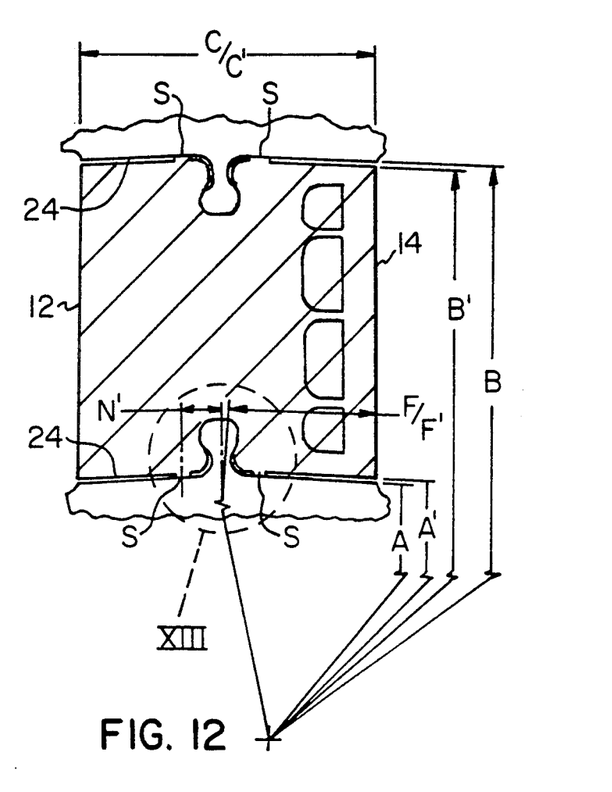
FIG. 12 is an enlarged top view of the completely replaced airfoil of FIG. 11.
Figure 13:
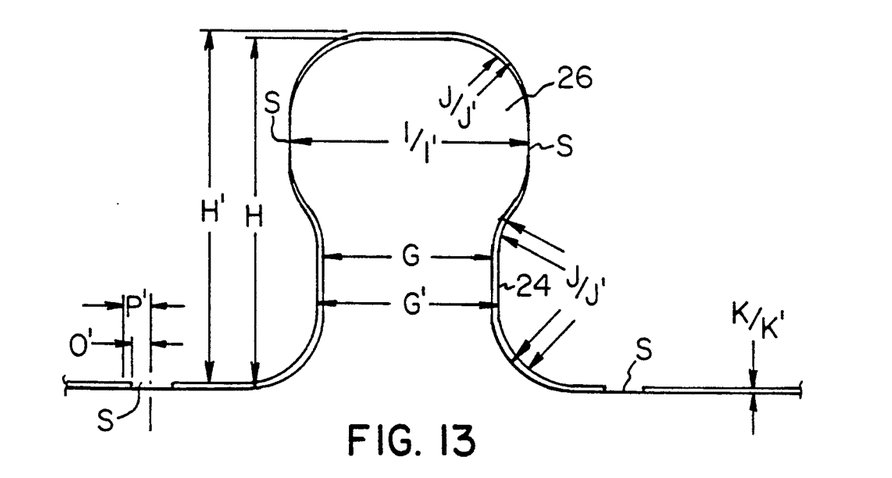
FIG. 13 is an enlarged top view of the encircled area of FIG. 12.

For removal of the distressed portions, the vane sections are precisely oriented in standard holding fixtures. The precise cutting path must be developed in accordance with preestablished engineering considerations of the final joint bonding methods. Precision gaps need to be maintained on reassembly. Referring to FIGS. 12 and 13, at key locations, zero gap standoffs S may be provided to precisely locate the replacement member and establish rejoining gaps. The standoffs abut the replacement member. During the distressed section removal cut, the EDWC wire moves along the inside (tangency) of the CNC programmed cutting path which allows the resultant surface of the original section to be cut to finished size. The removed distressed section thereby "absorbs" the kerf of the wire and the wire size is of no consequence.

Figure 14:
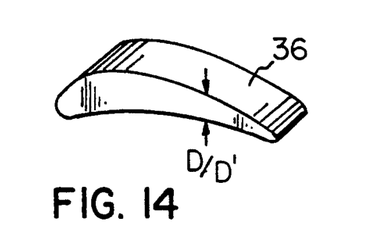
FIG. 14 is a perspective view of a blank airfoil for use in forming a replacement member.
Figure 15:
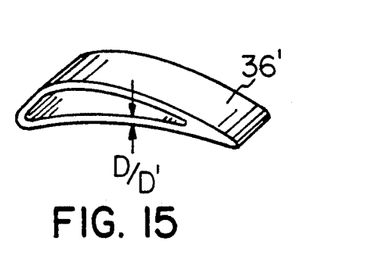
FIG. 15 is a perspective view of a cored blank airfoil.

The blank 36, 36' shown in FIGS. 14 and 15, from which the replacement member is to be cut is precisely oriented in the standard holding fixture. The blank may be scrapped nonengine run castings (scrapped for defects outside the area to be used) or from independently manufactured insert blanks (used when scrap castings are not available or when base material is not castable). During this cut, the EDWC wire moves along the outside (tangency) of the CNC programmed cutting path which allows the replacement member to be cut to finished size. The discarded portion of the insert blank "absorbs" the kerf. Again, wire size is therefore of little consequence.

Most preferably, the EDWC cutting wire W is not parallel to a reference line at all locations but the cut edges slightly converge to one side of the replacement member. For example, at least a portion of the cutting path may define a taper on bonding surfaces 38, 40, wherein the bonding surface 40 tapers along a longitudinal axis x and is positioned between a first surface 42 and a second surface 44. The first surface 42 and the second surface 44 are spaced apart along the longitudinal axis x. In this instance, replacement members may be dropped into place and all surfaces of the vane will come into proper alignment. The replacement members may then only be removed by lifting in one direction, substantially parallel to the tapered bonding surfaces. The taper aids in stress dissipation, increases cross-sectional strength through expanded bond surface area and minimizes the possibility of the replacement member being displaced by the gas loading pressures in the operating turbine. The taper can be added to all bond surfaces but, as a practical matter, the tapered surfaces may be limited to the interlocking projections 26, 27 and sockets 31, 32 due to the interference between the wire and the flowpath walls. In cases where the entire airfoil is being replaced, bonding surface 38 on projections 26, 27 may be provided with reverse tapers so that airfoil 10 may be removed only by lifting the airfoil in one direction with respect to projection 26 and then in an opposite direction with respect to projection 27. Thus, the airfoil is impossible to remove when flowpath walls 17, 18 are fixed relative to one another, such as when the vane section is properly replaced in its turbine assembly.

The EDWC cutting process inherently results in a "recast" layer along the bonding surfaces 38, 40. This layer is a metallic layer that was melted during the EDWC cutting process and has resolidified. It may have different and unacceptable properties compared with the bulk section. It may, therefore, be desirable to remove the recast layer by chemical and/or mechanical means. It may also be desirable to plate the bonding surfaces, for example with a noble metal to facilitate bonding of the replacement member. Since both recast layer removal and bonding surface plating will change the dimensional characteristics of the airfoil and/or vane sections and the replacement members, these processes must be considered when developing engineering data for the CNC programming.

The vane sections and the replacement members are assembled with a fit that may be a pressed fit (hand pressure fit) in preparation for bonding. The component and replacement member surfaces are brought in registry. The replacement member is in registry when the inside and outside contours of the vanes reach a flush or equal condition. The replacement member is then tack welded in place to preserve orientation during the metallurgical joining process. Any number of metallurgical joining processes may be used including, for example, fusion welding, brazing, plasma spray, chemical bonding, etc. The details of the metallurgical joining process form no part of this invention, but they must be considered when developing the engineering data for the CNC program.

The bonded airfoil sections are then machined so that surfaces will be blended back to original contours/dimensions. Thereafter, the airfoil sections are subjected to various nondestructive tests such as FPI, X-ray, water flow, water pressure, airflow and dimensional inspection to insure conformance to integrity requirements.

The vane sections are reassembled using a standard holding fixture and tack welded. Proper orientation and registry must be established. If the facing triangle cutouts were provided along the cutting path 20, round wires/pins of the correct diameter and alloy can be inserted into the space provided by the triangular cutouts to correctly space and align the vane sections with the adjacent flowpath walls. Upon achieving the correct orientation, the flowpath walls are tack welded together and subjected to one of the metallurgical joining processes mentioned above.

Having thus defined our invention in the detail and particularity required by the Patent Laws, what is desired protected by Letters Patent is set forth in the following claims.

I claim:

1. A method of repairing a metal structure having a first surface and a second surface which are spaced apart along a longitudinal axis, comprising the steps of:
    a) identifying a portion of said metal structure to be repaired;
    b) defining a cutting path on the metal structure around said portion, said cutting path including a plurality of projections and corresponding sockets;
    c) excising said portion from the metal structure along said cutting path to leave a first tapered bonding surface positioned between the first surface and the second surface on said metal structure corresponding to said cutting path wherein said tapered bonding surface tapers along the longitudinal axis;
    d) forming a replacement member having outer dimensions corresponding to said cutting path and having at least one projection or socket, said replacement member having a second complementary tapered bonding surface for mating with said first tapered bonding surface on the metal structure;
    e) inserting said replacement member into the metal structure to align said first and second tapered bonding surfaces and mechanically interlock said projections and corresponding sockets; and
    f) securing said replacement member in the metal structure by a metallurgical joining process.

2. The method of claim 1 wherein said cutting path defines at least two projections on said excised portion and said replacement member, with at least two corresponding sockets in the metal structure.

3. The method of claim 1 wherein said cutting path defines at least two projections on said metal structure, with at least two corresponding sockets in said excised portion and said replacement member.

4. The method of claim 1 wherein said projections and corresponding sockets are rounded.

5. The method of claim wherein step (c) includes removing a cutting kerf from the excised portion and step (d) includes forming said replacement member with outer dimensions which compensate for the now removed cutting kerf, enabling a close fit and predictable joint control between the replacement member and the metal structure.

6. The method of claim 1 wherein said first and second bonding surfaces arc tapered in a manner which permits insertion of the replacement member into the metal structure by pressing in only one direction, substantially parallel to the tapered surfaces.

7. The method of claim 3 wherein said first and second bonding surfaces include a taper which permits insertion of one of said projections into its corresponding socket by pressing the replacement member in one direction, while the other projection may only be inserted by pressing in an opposite direction.

8. The method of claim 1 wherein said portion is excised using a non-conventional machining process.

9. The method of claim 8 wherein said non-conventional machining process includes computer numerically controlled continuous wire electrical discharge machining.

10. A method of repairing one or more turbine components having a first surface and a second surface which are spaced apart along a longitudinal axis, comprising the steps of:
    a) identifying a portion of the component to be repaired;
    b) defining a cutting path on the component around said portion, said cutting path including a plurality of projections and corresponding sockets;
    c) excising said portion from the component along said cutting path using a non-conventional machining process to leave a first tapered bonding surface positioned between the first surface and the second surface on said component corresponding to at least a portion of said cutting path wherein said tapered bonding surface tapers along the longitudinal axis, said machining process conducted so that a cutting kerf is taken from the excised portion;

d) forming a replacement member having outer dimensions corresponding to said cutting path and having at least one projection or socket, said replacement member having a second tapered bonding surface for mating with the first tapered bonding surface on the component, said replacement member further having outer dimensions which compensate for the now removed cutting kerf;

e) inserting said replacement member into the component to align said first and second tapered bonding surfaces and mechanically interlock said projections and corresponding sockets, with the outer dimensions of said replacement member enabling a close fit and predictable joint control between the replacement member and said component; and f) securing said replacement member in the component by a metallurgical joining process.

11. The method of claim 10 wherein said first tapered bonding surface corresponds to sockets in the component and said second tapered bonding surface corresponds to projections on said excised portion and said replacement member.

12. The method of claim 10 wherein said projections and corresponding sockets are rounded.

13. The method of claim 10 wherein said first and second bonding surfaces are tapered in a manner which permits insertion of the replacement member into the component by pressing in only one direction, substantially parallel to the tapered surfaces.

14. The method of claim 10 wherein said first and second bonding surfaces are tapered in a manner which permits insertion of a first projection into its corresponding socket by pressing the replacement member in one direction, while a second projection may only be inserted by pressing the replacement member in an opposite direction.

15. The method of claim 10 wherein said non-conventional machining process is computer numerically controlled so that data representing said cutting path is stored in a computer program.

16. The method of claim 15 wherein said non-conventional machining process includes computer numerically controlled continuous wire electrical discharge machining.

17. The method of claim 15 wherein said replacement member is formed by executing said computer program to cut the replacement member from a blank using said non-conventional machining process, said replacement member thereby having outer dimensions which correspond to said cutting path.

18. The method of claim 10 wherein said cutting path further includes a plurality of joint standoffs and gas bending load dampers.

19. A method of repairing turbine vane sections having a first surface and a second surface which are spaced apart along a longitudinal axis, including airfoils and flowpath walls, comprising the steps of:

a) identifying a portion of the vane section to be repaired;

b) defining a cutting path on the vane section around said portion, said cutting path including a plurality of rounded projections and corresponding sockets;

c) excising said portion from the vane section along said cutting path using computer numerically controlled continuous wire electrical discharge machining to leave a first tapered bonding surface positioned between the first surface and the second surface on said vane section corresponding to the rounded projections or corresponding sockets thereon wherein said tapered bonding surface tapers along the longitudinal axis, said machining conducted so that a cutting kerf is taken from the excised portion;

d) storing data representing said cutting path in a computer program;

e) forming a replacement member by executing said computer program to cut the replacement member from a blank using continuous wire electrical discharge machining, said replacement member thereby having at least one projection or socket and a second tapered bonding surface for mating with said first tapered bonding surface, with outer dimensions which correspond to said cutting path and which compensate for the now removed cutting kerf;

f) inserting said replacement member into the vane section to align said first and second tapered bonding surfaces and mechanically interlock said projections and corresponding sockets, with the outer dimensions of said replacement member enabling a close fit and predictable joint control between said replacement member and the vane section; and g) securing said replacement member in the vane section by a metallurgical joining process.

* * * * *